UNITED STATES PATENT OFFICE.

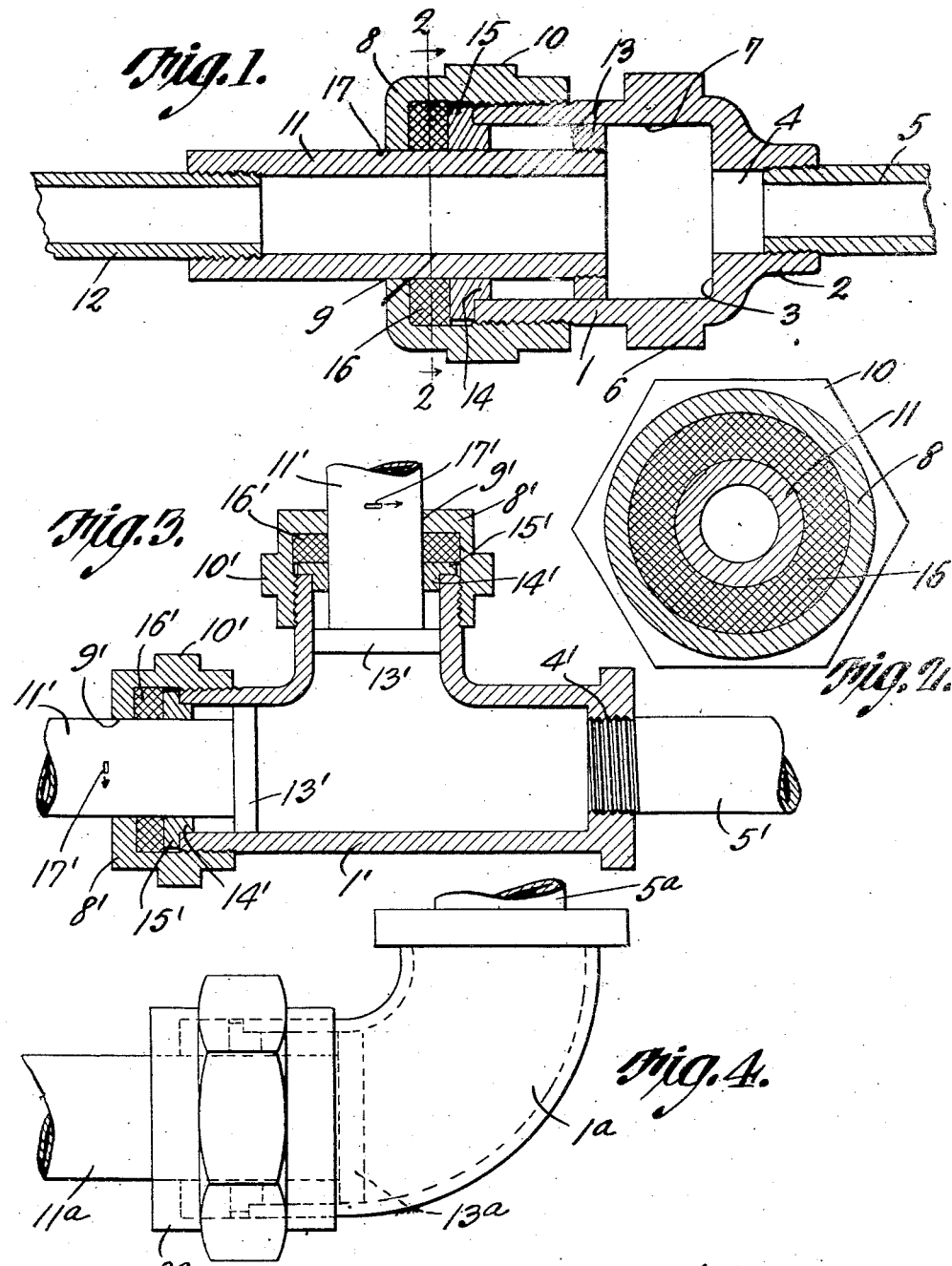

IRVIN A. KIDD, OF SALISBURY, NORTH CAROLINA.

EXPANSIBLE PIPE-JOINT.

1,159,845.    Specification of Letters Patent.    Patented Nov. 9, 1915.

Application filed September 9, 1914. Serial No. 860,904.

*To all whom it may concern:*

Be it known that I, IRVIN A. KIDD, a citizen of the United States, residing at Salisbury, in the county of Rowan and State of North Carolina, have invented a new and useful Expansible Pipe-Joint, of which the following is a specification.

The present invention appertains to pipe joints, and aims to provide a novel and improved expansible joint for water, air and steam pipes, and adapted particularly for use on trains.

The present invention contemplates the provision of a pipe joint embodying a unique assemblage of the component parts, whereby the pipes which are attached to the coupling may expand and contract due to changes in their temperatures, and whereby the pipes will be constrained for proper sliding movement.

This invention also aims to provide an expansible pipe joint of the nature indicated, having effective means for preventing leakage, as the pipes expand and contract.

It is also within the scope of the invention to provide a pipe joint of the character specified, which will be comparatively simple, substantial and inexpensive in construction, which may be readily and inexpensively installed upon various fluid pipes, and which will be convenient, serviceable, thoroughly practical and efficient in its use.

With the foregoing and other objects in view, which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in several of its embodiments in the accompanying drawing, wherein:—

Figure 1 is a longitudinal section of the straight form of the invention. Fig. 2 is a cross section taken on the line 2—2 of Fig. 1. Fig. 3 is a longitudinal section of a T-shaped coupling embodying the present improvements. Fig. 4 is a side elevation of an elbow coupling constructed in accordance with the present invention.

At the outset, it is to be noted that with the ordinary unions or couplings employed in train pipes, and the like, it not infrequently happens that the pipes become ruptured or broken due to the expansive and contractive efforts thereof, when temperature varies, and the prevailing unions or couplings are also not infrequently the cause of trouble in other respects, which are well known to trainmen and others versed in the art. The present invention aims to overcome the above difficulties by the provision of an expansible pipe joint or coupling designed particularly to enable the pipes connected thereto to expand and contract, without danger of leakage, and in a proper manner.

In carrying out the present invention, reference being had particularly to Figs. 1 and 2, wherein one form of the invention is illustrated, there is provided a socket or tubular section 1 having the reduced end 2, providing the interior shoulder 3, and having the reduced bore 4 extending therethrough for the threaded engagement of one pipe 5. The socket member 1 is provided upon its periphery, with a hexagonal or wrench-engaging enlargement 6, for enabling the section 1 to be readily rotated through the medium of a wrench or other implement. The socket or bore 7 of the section 1 is of uniform diameter throughout between the shoulder 3 and the mouth of the socket section 1.

The coupling or joint embodies a second section 8, of cup-shape, and having the central opening 9, and the enlarged hexagonal or wrench-engaging portion 10 upon its rim or periphery to enable the cup-shaped section 8 to be readily rotated. The rim of the section 8 is threaded upon the mouth portion of the section 1.

A third section 11 of the coupling, which is tubular in form, is slidable snugly through the opening 9 of the section 8, and has another pipe 12 threaded into its outer or protruding end.

A collar 13 is threaded or otherwise engaged upon the inner end of the tubular section 11, although the collar 13 may be integral with the section 11, and the collar 13 is slidable snugly within the socket or bore 7 of the section 1. The bore of the tubular section 11 is of the same diameter as the bore 4 of the reduced end 2 of the section 1, and the sections 1, 8 and 11 are all in alinement or coaxial, in order that the pipes 5 and 12 may be properly guided for axial movement to and from each other when they expand and contract.

A ring 14 is engaged snugly within the mouth portion of the socket section 1, and is provided with an annular outturned lip or flange 15 seating against the end of the section 1 surrounding the mouth thereof, and any suitable compressible packing 16 is disposed within the cup or cap section 8 and against the ring or annulus 14 to embrace the tubular section 11 when the cup section 8 is threaded upon the socket section 1.

It is preferable to provide the tubular section 11 with a notch or pointer 17 which will register with the outer face of the section 8, when the tubular section 11 and socket section 1 are at neutral or normal position with respect to one another. This will enable the parts to be readily adjusted in assembling them, whereby the pipes 5 and 12 may expand and contract to a predetermined or limited extent.

The tubular section 11 sliding through the opening 9 of the section 8, and through the ring 14, and having the collar 13 sliding within the section 1, will cause the sections 1 and 11 to slide in a true axial manner, for properly guiding the pipes 5 and 12 to and from each other, without the presence of a lateral vibration. The collar 13 sliding within the section 1, will provide a primary means for preventing the escape of the pressure fluid, and the ring 14 fitting tightly within the mouth portion of the section 1 and snugly embracing the tubular section 11, will provide a second means for preventing the escape of the pressure fluid, while the packing 16 in embracing the tubular section 11 will provide a third and most effective means for said result. Since the collar 13 has a limited sliding movement between the shoulder 3 of the section 1, and the ring 14, the sections 1 and 11 may expand and contract sufficiently, to permit of the axial movements of the pipes 5 and 12 as they expand and contract, and in this manner, the coupling may adjust itself to the expansion and contraction of the pipes 5 and 12, without danger of leakage, or without danger of lateral vibration or displacement of the pipes. The cup section has a smooth interior portion between the adjacent end of the tubular section 1 and the disk portion of the cup section, and the packing 16 is disposed snugly within said smooth portion of the cup section around the tubular section 11 between the ring, 14 and cup section 8. The ring 14 is of L-shaped section so as to have one flange resting against the respective end of the tubular section 1, and another flange to fit within said end of the section 1. The smooth portion of the section 8 enables said section to be rotated without the liability of the packing 16 being torn or shredded. The present coupling is adapted particularly for use on train pipes, service pipes, and the like, although it may be employed in divers capacities.

In the form delineated in Fig. 3, a T-shaped casing or section 1' is provided, the same having the internal threads 4' at one end for the reception of one pipe 5'. Cup sections 8' are threaded upon the other end and the arm or branch of the casing or section 1', and are provided with the central apertures 9' and with the hexagonal or wrench-engaging portions 10' upon their rims or peripheries. The tubular sections 11', which are disposed at right angles to one another, and one of which is in alinement with the pipe 5', are slidable through the openings 9' of the sections 8', and are provided at their inner ends with collars 13' slidable within one end portion of the section 1' and the arm or branch of the said section 1'. Rings 14' are fitted snugly within one end of the section 1' and the arm or branch of the said section, and are provided with the flanges 15' resting against the said end and arm of the section 1'. Packing washers 16' are disposed within the cup sections 8' and against the rings 14', to tightly embrace the tubular sections 11' when the sections 8' are threaded upon the section 1'. The sections 11' are preferably provided with the pointers 17' for indicating the normal positions of the said sections relative to the section 1'.

The form illustrated in Fig. 3 has the general advantages of the form illustrated in Fig. 1, and furthermore, it will be noted that the pipes or sections 5' and 11' which are in alinement, may not only expand and contract, but may move upwardly and downwardly relative to the upper or vertical section 11'. Thus, the several pipes or sections 5' and 11' may move or vibrate in various directions in the plane of the said pipes or sections, without danger of leakage, and to take up any expansion or contraction, or jars and vibrations.

In the form illustrated in Fig. 4, the section 1ª is in the form of an elbow, and is adapted to have one pipe 5ª threaded into one end thereof, while the cup section 8ª is threaded upon the other end or arm of the section 1ª and has the tubular section 11ª slidable therethrough, in the same manner as illustrated in Fig. 1. Thus, the elbow joint enables the pipes or sections 5ª and 11ª to vibrate and expand and contract relative to one another.

From the foregoing, it will be manifest that the several forms of the invention have common and independent advantages, due to their variations, and enable the present invention to be employed in various capacities. The tubular sections 11, 11', and 11ª of the three forms may also be taken to represent the end portions of the respective pipes, whereby the respective pipes may be passed through the cup sections with the same result.

Having thus described the invention, what is claimed as new is:—

A pipe joint embodying a tubular section, a cup section having its rim threaded upon one end of the tubular section and having a central opening and a smooth interior portion between said end of the tubular section and the disk portion of the cup section, a second tubular section slidable through the opening, a collar secured upon the second tubular section and working snugly in the first mentioned tubular section, a ring of L-shaped cross section having one flange resting against and one flange fitting within said end of the first mentioned tubular section, and a packing disposed snugly within the smooth portion of the cup section around the second tubular section and between the cup section and ring.

In testimony that I claim the foregoing as my own, I have hereto affixed my signature in the presence of two witnesses.

IRVIN A. KIDD.

Witnesses:
 IVY E. SIMPSON,
 J. M. MONROE.